United States Patent
Saito et al.

(10) Patent No.: US 7,942,053 B2
(45) Date of Patent: May 17, 2011

(54) AIR FLOW MEASURING INSTRUMENT HAVING DUST PARTICLE DIVERTING STRUCTURE

(75) Inventors: Naoki Saito, Tokai (JP); Takeshi Morino, Hitachinaka (JP); Yuki Okamoto, Hitachinaka (JP); Keiji Hanzawa, Mito (JP); Hiromu Kikawa, Hitachinaka (JP); Akio Yasukawa, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 46 days.

(21) Appl. No.: 12/261,700

(22) Filed: Oct. 30, 2008

(65) Prior Publication Data

US 2009/0126477 A1     May 21, 2009

(30) Foreign Application Priority Data

Nov. 19, 2007   (JP) ................ 2007-298775

(51) Int. Cl.
*G01F 1/68*     (2006.01)
(52) U.S. Cl. ................ 73/204.26; 73/204.22; 73/204.21
(58) Field of Classification Search .......... None
See application file for complete search history.

(56) References Cited

U.S. PATENT DOCUMENTS

| | | | | |
|---|---|---|---|---|
| 4,624,138 A | * | 11/1986 | Ono et al. ........... | 73/204.26 |
| 4,833,912 A | * | 5/1989 | Ohta et al. .......... | 73/204.26 |
| 4,843,882 A | * | 7/1989 | Ohta et al. .......... | 73/204.26 |
| 4,986,122 A | * | 1/1991 | Gust .................. | 73/204.15 |
| 6,253,606 B1 | * | 7/2001 | Yonezawa et al. ..... | 73/204.26 |
| 6,298,720 B1 | | 10/2001 | Mueller et al. | |
| 6,557,408 B1 | * | 5/2003 | Mueller et al. ....... | 73/202.5 |
| 6,619,140 B2 | * | 9/2003 | Kitahara et al. ...... | 73/204.21 |
| 6,666,082 B2 | * | 12/2003 | Watanabe et al. ..... | 73/204.22 |
| 6,694,811 B2 | * | 2/2004 | Kohno et al. ........ | 73/204.22 |
| 6,851,311 B2 | * | 2/2005 | Nakada et al. ....... | 73/204.26 |
| 6,938,473 B2 | * | 9/2005 | Iwaki et al. ......... | 73/204.21 |
| 7,162,920 B2 | * | 1/2007 | Konzelmann et al. .. | 73/202.5 |

(Continued)

FOREIGN PATENT DOCUMENTS

EP     1 321 747 A2     6/2003

(Continued)

OTHER PUBLICATIONS

European Search Report dated Mar. 2, 2009 (Three (3) pages).

*Primary Examiner* — Harshad Patel
(74) *Attorney, Agent, or Firm* — Crowell & Moring LLP

(57) ABSTRACT

An air flow measuring instrument, comprising: an auxiliary passage 8 arranged inside a main passage through which fluid flows, a tabular member 5 on which a pattern of a heating resistor for measuring an air flow is provided on one face 5a, the tabular member being disposed inside the auxiliary passage so that the one face 5a on which the heating resistor pattern of the tabular member is provided is disposed along a flow of fluid inside the auxiliary passage 8, a heating resistor pattern-side fluid passage 8a portion formed so that the fluid flows between the face 5a and a passage-forming surface 8d of the auxiliary passage, and a back-surface 8b side fluid passage portion formed so that fluid flows between a face 5b on a side opposite to the face of the tabular member and the passage-forming surface of the auxiliary passage. Guidance portion 13 guiding dust that collides against the end portion to back-surface side fluid passage portion 8b side is provided on upstream-side end of tabular member.

6 Claims, 6 Drawing Sheets

U.S. PATENT DOCUMENTS

| | | | |
|---|---|---|---|
| 7,211,873 B2 * | 5/2007 | Toyoda | 73/204.26 |
| 7,360,414 B2 * | 4/2008 | Konzelmann et al. | 73/202.5 |
| 2002/0174718 A1 * | 11/2002 | Yamakawa | 73/204.26 |
| 2003/0094041 A1 * | 5/2003 | Iwaki et al. | 73/204.21 |
| 2007/0253739 A1 | 11/2007 | Kagawa | |

FOREIGN PATENT DOCUMENTS

| | | |
|---|---|---|
| JP | 6-20974 Y2 | 6/1994 |
| JP | 2003-262144 A | 9/2003 |
| WO | WO 01/53780 A2 | 7/2001 |

* cited by examiner

AIR FLOW MEASURING INSTRUMENT HAVING DUST PARTICLE DIVERTING STRUCTURE

BACKGROUND OF THE INVENTION

1. Field of the Invention

The present invention relates to a flow meter, and more particularly to an air flow measuring instrument that comprises an intake system of an automobile engine and is suitable for detecting and controlling an air-intake amount.

2. Background Art

An instrument that measures a flow rate using the amount of heat discharge of a heating resistor obtained by carrying out heat control of the heating resistor, and an instrument that measures a flow rate by carrying out heat control of a heating resistor and measuring temperature changes in a temperature sensing resistor disposed adjacent to the heating resistor and the like are known as air flow measuring instruments that measure an air flow rate. The air flow measuring instrument is mounted in one part of an air intake duct of a vehicle, and fulfills the role of measuring the intake air flow rate. Normally, an air filter is provided in the air intake duct, and dust included in air that flows into the air intake duct is removed with the air filter. However, depending on the size of the dust, some dust may pass through the air filter, or dust may enter inside the air intake duct due to a mounting fault after replacing the air filter. Dust that enters into the air intake duct is accelerated up to a velocity of several tens of m/s together with a fluid when the amount by which the accelerator is depressed increases, and in some cases the dust may reach the inside of an auxiliary passage of the air flow measuring instrument. An air flow measuring element that is disposed inside the auxiliary passage has an extremely thin portion, and the air flow measuring element may be broken by the dust colliding therewith. Further, when dust that enters into the air intake duct adheres to the air flow measuring element of the air flow measuring instrument, there is the possibility that the heat discharge properties of the air flow measuring element will change and cause a change in the output properties.

A thermal air flow measuring instrument is known in which, as a structure for protecting an air flow measuring element from dust and the like that enters the inside of an air intake duct and preventing deterioration over time due to contamination, a heat sensing resistor is arranged at an angle of from 20 to 60 degrees with respect to the flow direction of fluid so that the air flow detection portion is on the undersurface side (see Patent Document 1). Further, an air flow measuring instrument is known in which, in order that an antisensing portion faces an upstream direction, an air flow measuring element is mounted so as to be inclined by an angle α with respect to the axial direction of the flow path (see Patent Document 2).

[Patent Document 1] JP Utility Model Publication (Kokoku) No. 6-020974 (1994)
[Patent Document 2] JP Patent Publication (Kokai) No. 2003-262144

SUMMARY OF THE INVENTION

According to the conventional technology, although there is an effect to protect the air flow measuring element from dust and the like, because the adopted configurations are those in which the surface on which the air flow measuring element is disposed is hidden with respect to the flow, there is the problem that, with regard to the flow rate that should primarily be measured, it is difficult to perform stable measurement using turbulence by exfoliation flow of fluid or the like.

An object of the present invention is to provide a highly reliable air flow measuring instrument which has a good dust-proofing and is unlikely to cause measuring characteristic errors.

To achieve the above described object, an air flow measuring instrument of the present invention comprises: an auxiliary passage arranged inside a main passage through which a fluid flows, a tabular member on which a pattern of a heating resistor for measuring an air flow is provided on one face, the tabular member being disposed inside the auxiliary passage so that the one face on which the heating resistor pattern of the tabular member is provided is disposed along a flow of fluid inside the auxiliary passage, a heating resistor pattern-side fluid passage portion formed so that the fluid flows between the face of the tabular member and a passage-forming surface of the auxiliary passage; and a back-surface side fluid passage portion formed so that fluid flows between a face on a side opposite to the face of the tabular member and the passage-forming surface of the auxiliary passage; wherein, on an upstream-side end of the tabular member is provided a guidance portion that guides dust that collides against the end to the back-surface side fluid passage portion side.

The present invention is configured as described below.

According to the present invention, after dust bounces off an upstream-side end of a tabular member, the dust can be inhibited from travelling in the flow of a fluid to flow to a surface side on which a heating resistor pattern of a tabular member is provided, and thus damage or contamination of a fluid measuring element comprised by a heating resistor pattern or the like can be prevented.

BRIEF DESCRIPTION OF THE DRAWINGS

FIG. 5 is changed.

DETAILED DESCRIPTION OF THE PREFERRED EMBODIMENTS

A specific configuration relating to the present invention is as follows.

An air flow measuring instrument comprises an auxiliary passage arranged inside a main passage through which a fluid flows, a tabular member on which a pattern of a heating resistor for measuring an air flow is provided on one face, the tabular member being disposed inside the auxiliary passage so that the one face on which the heating resistor pattern of the tabular member is provided is disposed along a flow of fluid inside the auxiliary passage, a heating resistor pattern-side fluid passage portion formed so that the fluid flows between the face of the tabular member and a passage-forming surface of the auxiliary passage; and a back-surface side fluid passage portion formed so that fluid flows between a face on a side opposite to the face of the tabular member and the passage-forming surface of the auxiliary passage; wherein, on an upstream-side end of the tabular member, an inclined face is provided such that it faces the back-surface side fluid passage portion side rather than the heating resistor pattern-side fluid passage portion side.

At this time, it is better that the tabular member is formed as a circuit board comprising an electronic circuit to which the pattern of the heating resistor is electrically connected.

Further, it is better that the air flow measuring instrument comprises an electronic circuit to which the pattern of the heating resistor is electrically connected, and a housing frame body that contains the electronic circuit, and that the inclined face is molded integrally with the housing frame body.

Moreover, it is better that the auxiliary passage has at least one curved portion on an upstream side of the fluid measuring element, and that the inclined face is provided so as to cover one portion of an outer circumferential side of the curved portion of an upstream-side end portion disposed inside the auxiliary passage of the tabular member.

Moreover, it is better that the inclined face is formed with a softer member than the tabular member.

Further, it is better that the inclined face is formed by an upstream-side end of the tabular member.

The present specification encompasses the content of the specification of Japanese Patent Application No. 2007-298775 on which the priority of the present application is based.

Examples

The following examples relating to the present invention relate to an air flow measuring instrument that is used for measuring the flow rate of air that is taken into an internal combustion engine for an automobile, and provide a structure that prevents damage to an air flow measuring element by contaminants such as dust that mix with air that is taken in and flow through the inside of an air intake duct, and also performs stable air flow rate measurement. In the following description, contaminants such as dust are referred to simply as "dust".

Examples of the present invention will now be described specifically.

Figure 1:
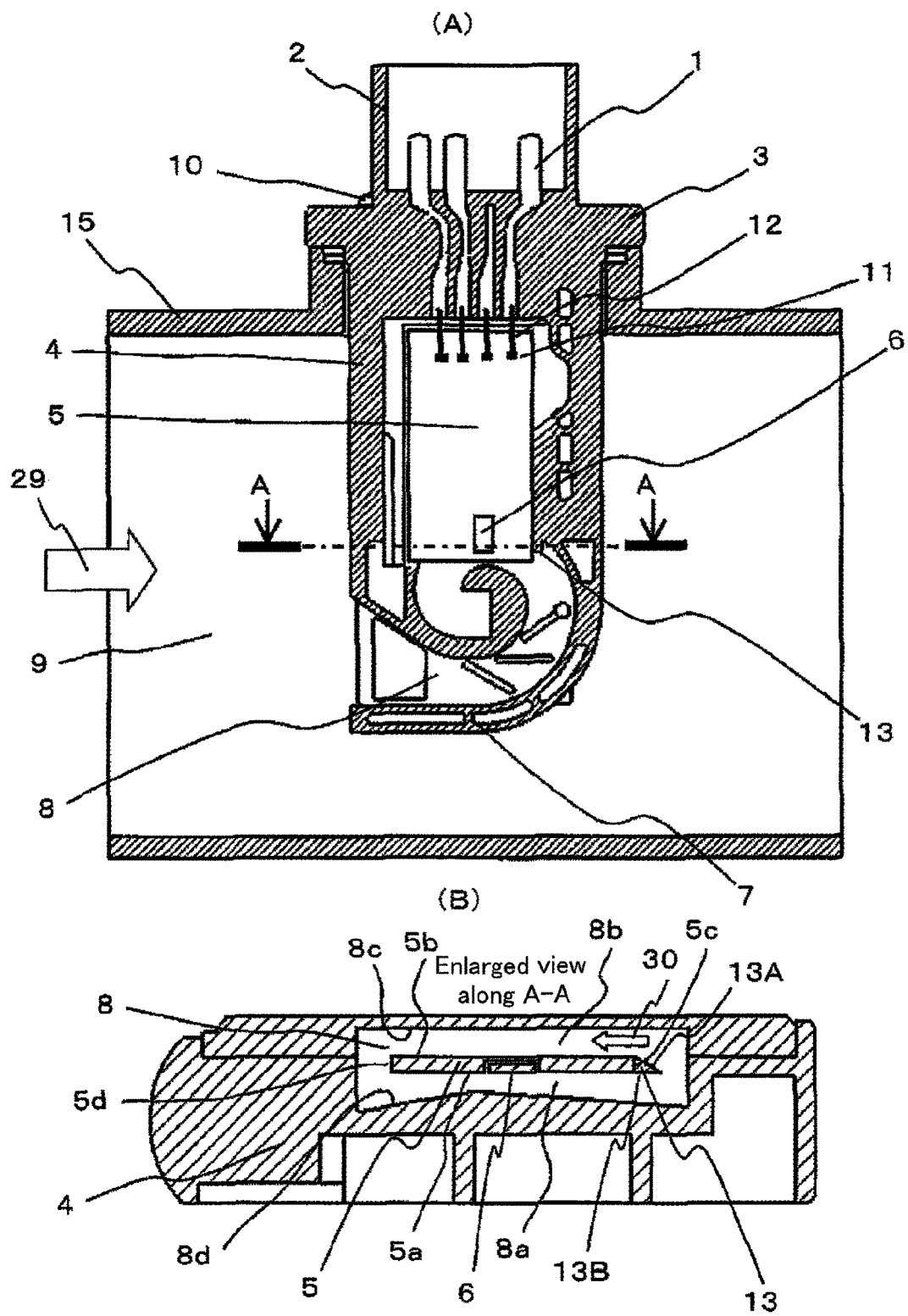
FIG. 1 are a longitudinal section of an air flow measuring instrument as one embodiment of the present invention and an enlarged view of a cross section A-A thereof.

FIG. 1(A) is a front view of an air flow measuring instrument illustrating an example of the present invention, and FIG. 1(B) is an enlarged view of a cross section A-A thereof. The components of the present example will now be described referring FIG. 1.

A connector 2 having a connector terminal 1 for electrically connecting an electronic circuit 5 and an external device, a module supporting portion 3 for fixing an air flow measuring instrument to a body 15 that is a fluid conduit component member, and a housing frame body 4 that holds the electronic circuit 5 are integrally molded with a plastic mould. The connector terminal 1 is electrically connected by a bonding wire 12 to a bonding pad 11 formed at an end of the electronic circuit 5.

The electronic circuit 5 is configured as a circuit board on which circuit elements are disposed on a substrate that is a tabular member and connected by wiring.

An air flow measuring element 6 is composed by a substrate that is a tabular member and a resistor pattern such as a heating resistor that is formed by a thin-film formation process on the substrate. The electronic circuit 5 is fixed so that the substrate face of the air flow measuring element 6 is substantially parallel with the substrate face of the electronic circuit (circuit board) 5. The electronic circuit 5 is contained inside the housing frame body 4, and is fixed so as to be parallel to the flow direction of a fluid 30 (FIG. 1(B)) that flows through the inside of an auxiliary air intake passage. In the present example, the fluid 30 is air.

In this case, a face 5a on which the heating resistor pattern is provided on the electronic circuit 5 is disposed along the flow of a fluid inside the auxiliary air intake passage 8, a heating resistor pattern-side fluid passage portion 8a along which fluid flows is composed between the heating resistor pattern-comprising face 5a of the electronic circuit 5 and a passage-forming surface 8d of the auxiliary air intake passage 8. Further, a back-surface side fluid passage portion 8b is composed between a face 5b on the side opposite to the heating resistor pattern-comprising face in the electronic circuit 5 and a passage-forming surface 8c of the auxiliary air intake passage 8. More specifically, the two faces 5a and 5b of the electronic circuit 5 are configured so that fluid flows thereon.

Further, at the upstream side end (side face) of the electronic circuit 5, as shown in FIG. 1(B), a guidance portion that guides fluid that contacts against the side face to the rear face (rear side) of the electronic circuit 5 is formed as a protrusion (protrusion provided on circuit board upstream side face) 13. In this case, the term "back face (rear side) 5b of the electronic circuit 5" refers to the substrate face on the side opposite to the substrate face 5a on the side on which the air flow measuring element 6 is formed, and is also called "back face (back face side)". In contrast, the substrate face 5a on the side on which the air flow measuring element 6 is provided is referred to as "air flow measuring element-comprising face" or "front face".

A flow non-guiding face 13B of the protrusion 13 is composed by a face that is parallel to a flat face on the air flow measuring element 6 side. A guiding face (flow guiding face) 13A of the protrusion 13 has an angle with respect to a flow in order to guide the flow to the back face of the electronic circuit 5, and that angle is formed such that the flow strikes against the guiding face 13A. That is, the protrusion 13 has an inclined face that comprises the guiding face 13A. The guiding face 13A that is the inclined face is inclined such that it faces the side of the fluid passage portion 8b on the back face side rather than the side of the fluid passage portion 8a on the heating resistor pattern side.

The protrusion 13 is arranged so as to cover a portion of the side face on the upstream side of the electronic circuit 5. Further, according to the present example, the protrusion 13 is molded integrally with the housing frame body 4, and a gap between the protrusion 13 and a side face on the upstream side of the electronic circuit 5 is arranged so as to be of such a degree that fluid does not flow therethrough. This is to suppress the occurrence of a case in which dust (dust, dirt, etc.) 14 passes through the gap and enters the air flow measuring element 6 side. In this connection, the term "upstream-side side face 5c of the electronic circuit 5" refers to a face that is located on the upstream side in the flow direction of fluid among the faces along the thickness direction of a circuit board comprising the electronic circuit 5. On the downstream side, a downstream-side side face 5*d* exists.

A bypass molding portion 7 in which the auxiliary air intake passage 8 is formed is joined to the housing frame body 4. The air flow measuring element 6 is disposed in the auxiliary air intake passage 8 in a state in which the air flow measuring element 6 is mounted to the electronic circuit 5. The housing frame body 4 and the bypass molding portion 7 are inserted into the body 15 from a rectangular hole formed in the body 15 constituting a fluid conduit and are tightened and fixed to the body 15 by a fixing screw 10. As a result, a part of air that flows through the intake air passage 9 and is taken into the engine is diverted into the auxiliary air intake passage 8. The flow rate of the diverted air is detected by the air flow measuring element 6 to detect the overall flow rate of air that is taken into the engine.

For example, in a case in which the above described air flow measuring instrument is attached to the body 15 constituting a fluid conduit of an internal combustion engine of an automobile or the like and is disposed inside the engine room together with an air intake duct, it can be considered that the air flow measuring instrument will receive the influence of dust.

Figure 2:
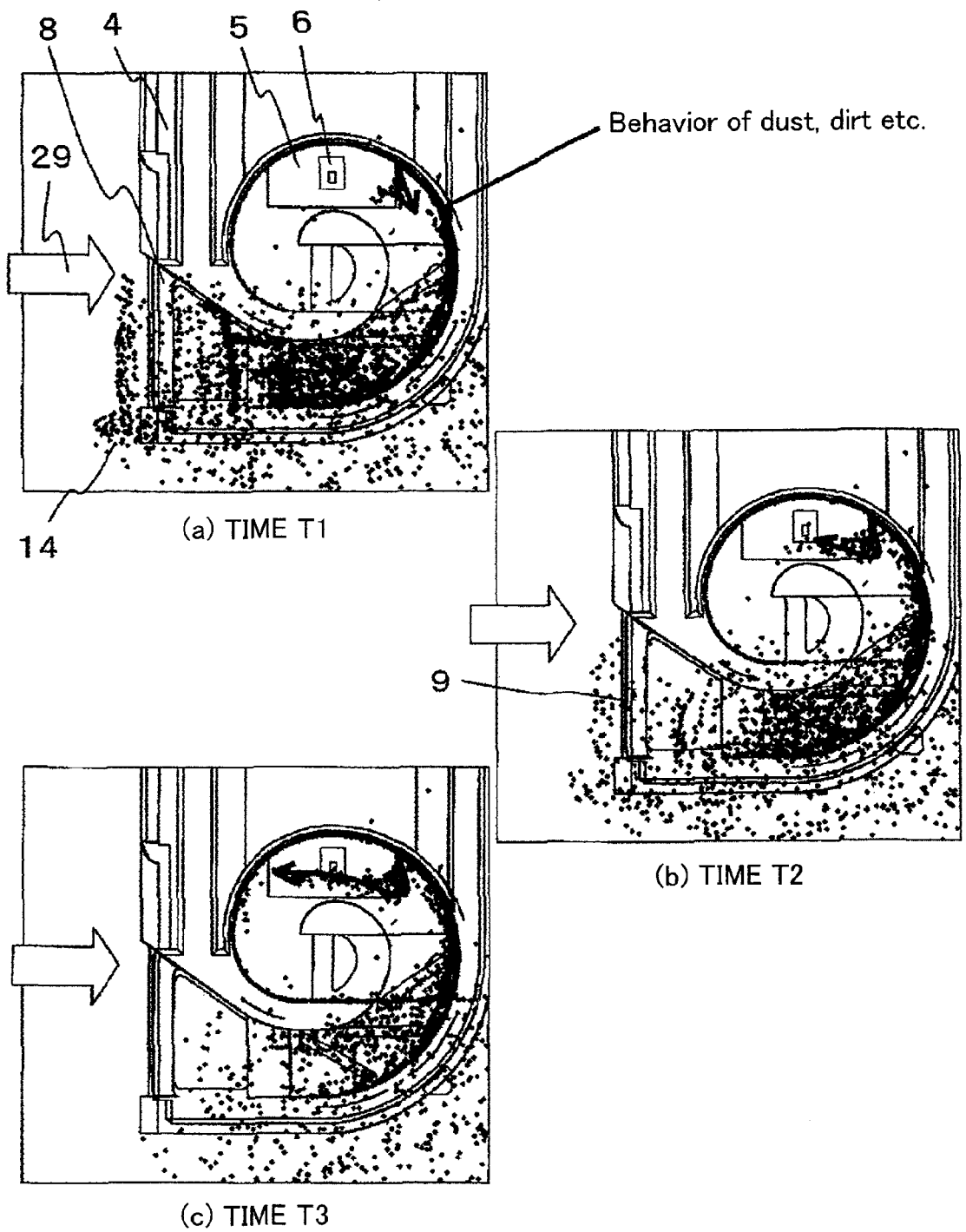
FIG. 2 are views illustrating particle distribution that are generated using CAE analysis that is performed for confirming the form of a track of dust in a case in which the present embodiment has not been implemented.

Here, the form of a track of dust or the like to the air flow measuring element 6 is described using FIG. 2. FIG. 2 is a view that illustrates the track of dust 14 for respective definite periods of time obtained using CAE analysis in a case in which the present invention is not implemented, that is, in a case in which the protrusion 13 is not provided in the vicinity of the upstream-side side face of the electronic circuit 5.

As shown in FIG. 2, since the auxiliary air intake passage 8 is a structure having a curve, the dust 14 that has entered into the auxiliary air intake passage 8 forms a track towards the outer circumferential side due to an inertial force. However, the dust 14 that collides against the upstream side surface that is perpendicular to the flow of the electronic circuit 5 is bounced back to a large extent in the opposite direction to the flow at a time T1, and at a time T2 is, conversely, pushed back by the flow towards the electronic circuit 5 again. Further, at a time T3, the dust 14 passes by the vicinity of the air flow measuring element 6 and flows towards the downstream side.

More specifically, according to FIG. 2, it can be confirmed that in a case where the protrusion 13 of the present example is not provided there is the possibility of the dust 14 colliding against the air flow measuring element 6.

Figure 3:
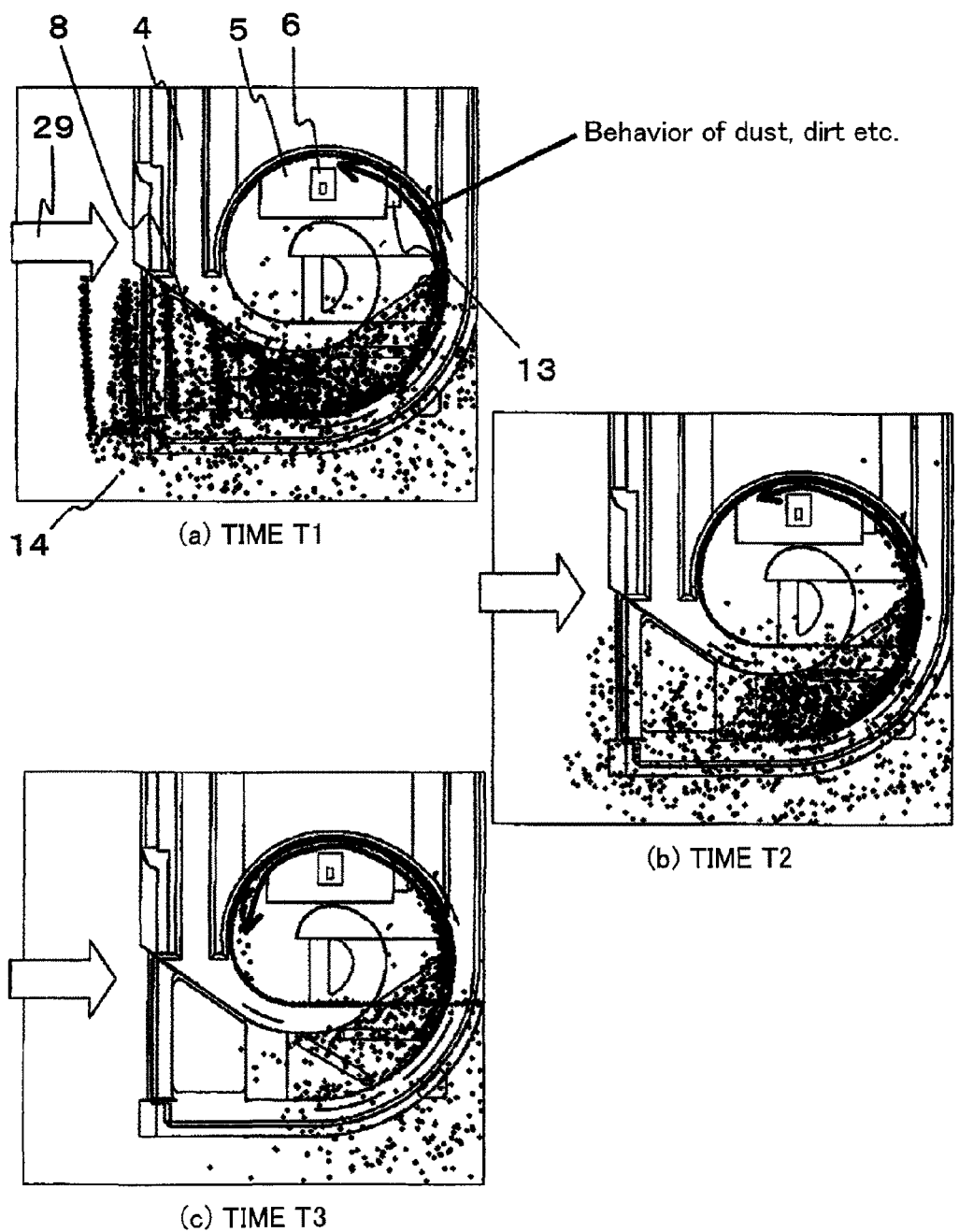
FIG. 3 are views illustrating particle distribution that are generated using CAE analysis that is performed for confirming the form of a track of dust in a case in which the present embodiment has been implemented.

Next, to confirm the effects of the example shown in FIG. 1, CAE analysis that is similar to the CAE analysis described above is executed for a case in which the protrusion 13 that guides the flow to the rear face is formed in the vicinity of the upstream-side side face of the electronic circuit 5. FIG. 3 illustrates the track of the dust 14 for respective definite periods of time obtained using CAE analysis in a case in which the protrusion 13 has been formed.

As shown in FIG. 3, since the auxiliary air intake passage 8 is a structure having a curve, until the dust 14 that has entered into the auxiliary air intake passage 8 arrives at the electronic circuit 5, the dust 14 forms a track towards the outer circumferential side due to an inertial force. However, it can be confirmed that by providing the protrusion 13 for guiding the flow to the rear face on the upstream-side side face of the electronic circuit 5, the dust 14 that collides against the protrusion 13 is guided to the rear face of the electronic circuit 5 without being bounced back to the upstream side. Thus, by merely providing the small protrusion 13, it is possible to suppress the entry of the dust 14 to the portion of the air flow measuring element 6, and further, the flow can be stabilized by eliminating a perpendicular face that causes exfoliation of the flow, that is, a situation in which the properties of the air flow measuring element 6 become instable is avoided. Accordingly, it is possible to ensure reliability for the air flow measuring element 6 at the time of mounting and the like, and realize an air flow measuring instrument for which changes in characteristics can be suppressed when downsizing, without an increase in costs.

As described above, the protrusion 13 not only guides the flow of fluid to the rear face of the electronic circuit 5, but also suppresses bouncing back of the dust 14 to the upstream side to make it easy for the dust 14 to flow to the rear face side of the electronic circuit 5. In this case, the protrusion 13 functions so that the dust 14 bounces towards the flow of fluid that flows towards the rear face side of the electronic circuit 5. Alternatively, a form may be considered in whereby the dust 14 rides on and flows with fluid that flows towards the rear face side of the electronic circuit 5 without bouncing to a large degree at the protrusion 13.

Figure 4:
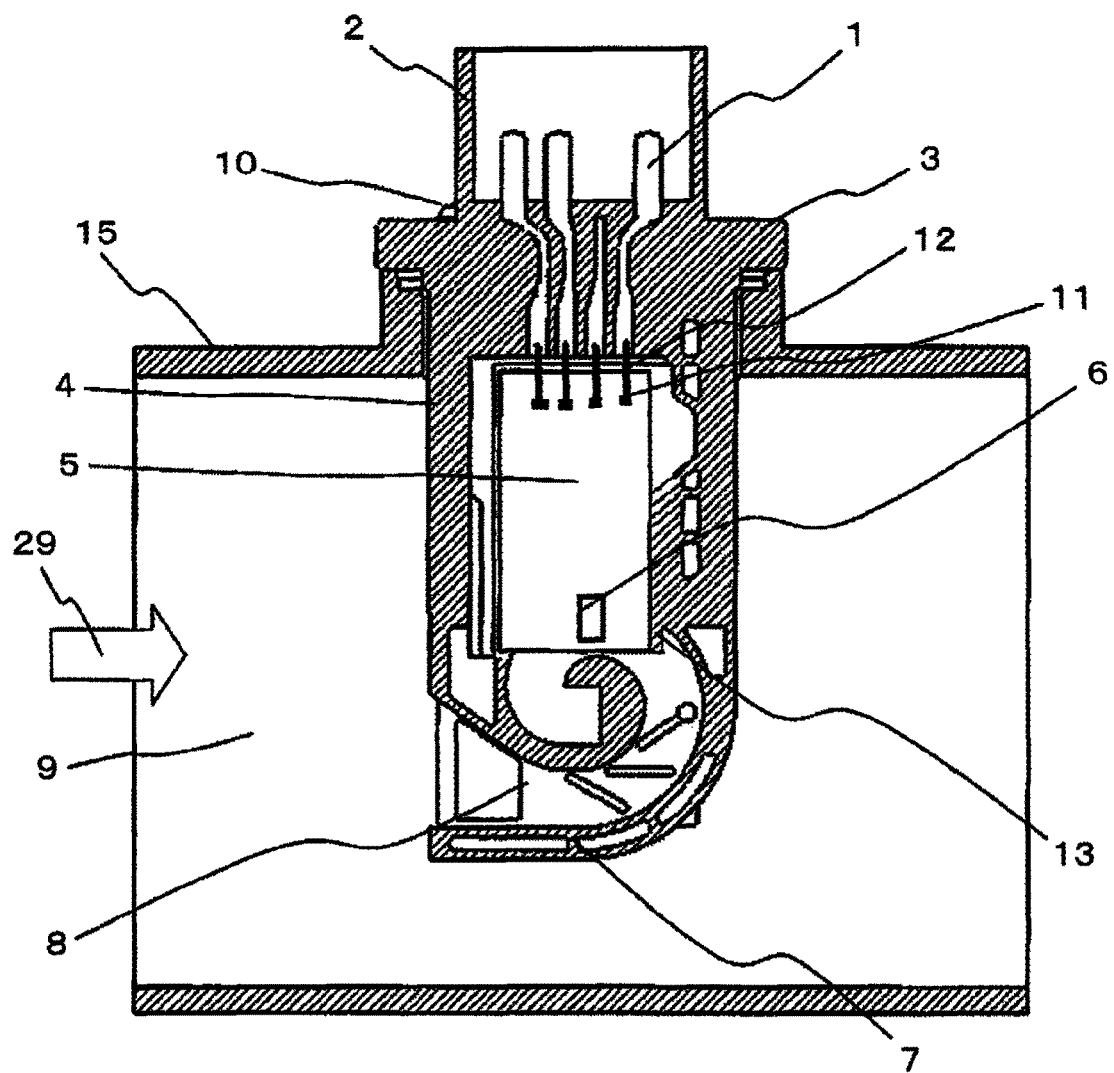
FIG. 4 is a longitudinal section of an air flow measuring instrument in a case in which the protrusion structure of the embodiment shown in FIG. 1 is changed.

With respect to the example shown in FIG. 1, as shown in FIG. 4, the protrusion 13 may be formed so as to cover all of a portion that is inserted into the auxiliary air intake passage 8 among the upstream-side side face of the electronic circuit 5.

When forming the protrusion 13 with plastic, although in comparison to a shape that covers one portion, the protrusion is inferior with respect to moldability since the protrusion consists of a long and narrow shape, when the flow speed of the fluid 30 inside the auxiliary air intake passage 8 is slow, or when the dust 14 is of a degree that does not undergo inertial separation, entry of the dust 14 to the air flow measuring element 6 side can be suppressed. According to this configuration, contamination of the air flow measuring element 6 can be prevented, that is, an air flow measuring instrument capable of suppressing changes in characteristics caused by deterioration due to contamination can be realized.

An effect greater or equal to that described above can be obtained when the protrusion 13 or guiding face 13A shown in FIG. 1 and FIG. 4 is constituted by members that are softer and have a lower restitution coefficient than the members constituting the electronic circuit 5 and the air flow measuring element 6. When the restitution coefficient of the protrusion 13 is large, it can be considered that the dust 14 will be bounced back to a large degree to the upstream side (opposite direction to the flow) by changes in the flow. More specifically, this is because the distance to the air flow measuring element 6 increases and there is also the possibility of the dust 14 reaching a flow speed at which the dust 14 will break the air flow measuring element 6 when the dust 14 is accelerated again by the flow and passes by the vicinity of the air flow measuring element 6.

Figure 5:
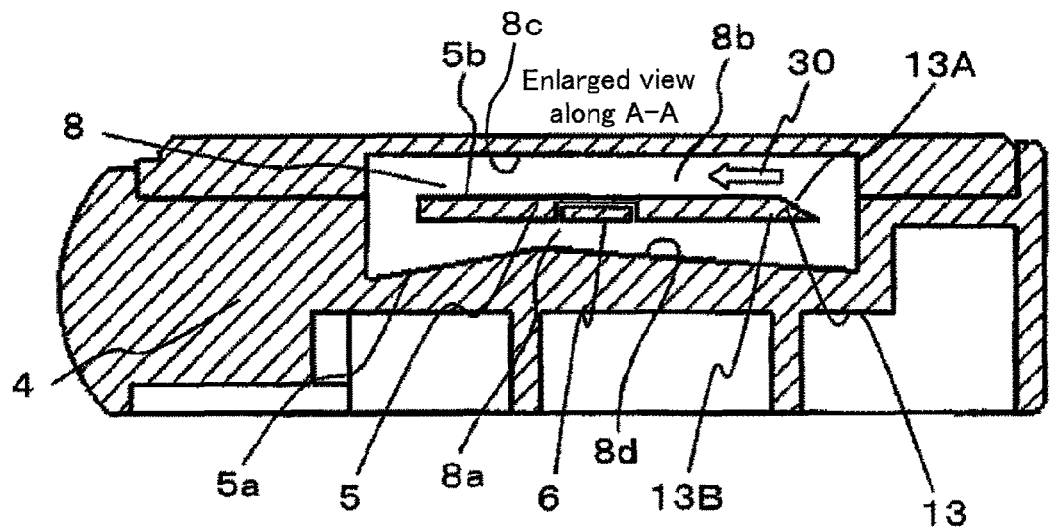
FIG. 5 is a longitudinal section of an air flow measuring instrument in a case in which the protrusion structure of the embodiment shown in FIG. 1 and in FIG. 4 is changed.

With respect to the examples shown in FIG. 1 and FIG. 4, as shown in FIG. 5, the protrusion 13 may be formed with the same member as the electronic circuit 5. Although this configuration is inferior in terms of productivity because it is technically more difficult in comparison to a shape that covers one portion, it is possible to suppress the entry of the dust 14 to the air flow measuring element 6 side in the same manner as described above. According to this configuration, breakage or contamination of the air flow measuring element 6 can be prevented. That is, a highly reliable air flow measuring instrument can be realized that can suppress changes in characteristics caused by deterioration due to contamination. Further, in the case of this configuration, since deviations in the positions of the electronic circuit 5 and the protrusion 13 due to production errors are eliminated, i.e., since level differences and gaps into which fluid flows are structurally eliminated, this structure is further advantageous with respect to stabilization of the flow.

Figure 6:
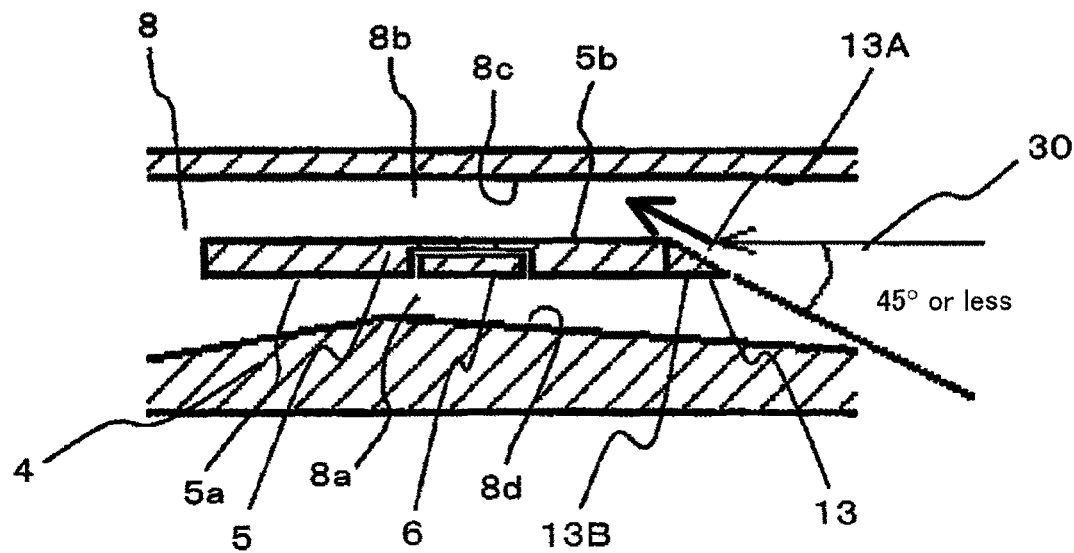
FIG. 6 is an enlarged view of a protrusion structure as one embodiment according to the present invention.

It is better for the angle of inclination of the guiding face 13A of the protrusion 13 shown in FIG. 1, FIG. 4, and FIG. 5 to be made less than or equal to 45° with respect to the flow of the fluid 30 in the auxiliary air intake passage 8 as shown in FIG. 6. It is thereby possible to effectively guide the dust 14 to the rear face of the electronic circuit 5. The reason that it is undesirable for the protrusion 13 to be at an angle greater than 45° with respect to the flow of the fluid 30 inside the auxiliary air intake passage 8 is that it increases the possibility that the dust 14 that collides against the guiding face 13A will be returned further to the upstream side than the protrusion 13 and the re-accelerated dust 14 will enter the air flow measuring element 6 side.

Figure 7:
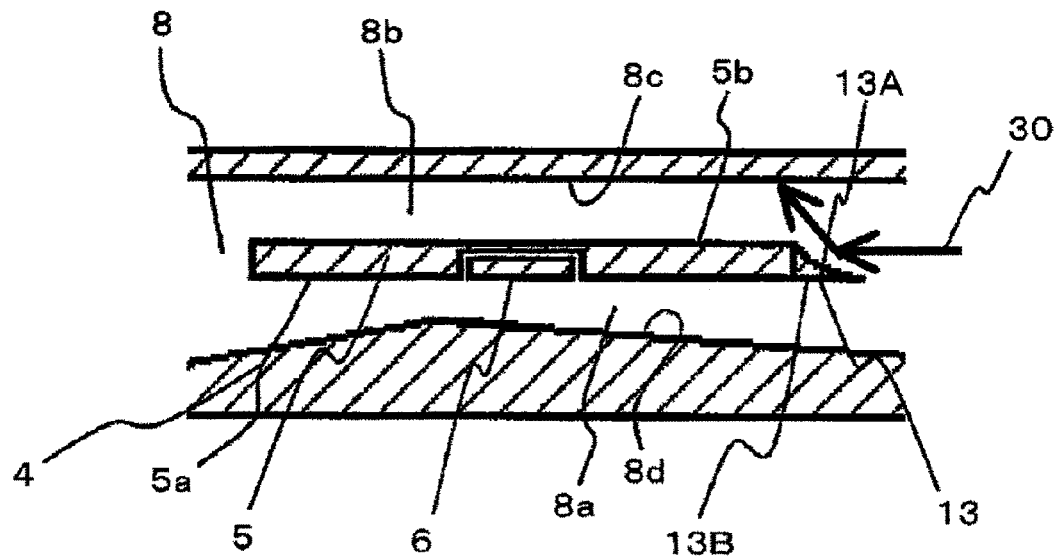
FIG. 7 is an enlarged view in a case in which the protrusion structure shown in FIG. 1, FIG. 4.

Further, it is better for the guiding face 13A of the protrusion 13 shown in FIG. 1, FIG. 4, and FIG. 5 to be formed as a concave curved surface with respect to the flow of the fluid 30 inside the auxiliary air intake passage 8 as shown in FIG. 7. It is thereby possible to effectively guide the dust 14 to the rear face of the electronic circuit 5. The reason that it is undesirable for the protrusion 13 to be formed in a convex shape with respect to the flow of the fluid 30 inside the auxiliary air intake passage 8 is that, similarly to the configuration shown in FIG. 6, it increases the possibility that the dust 14 that collides against the guiding face 13A will be returned further to the upstream side than the protrusion 13 and the re-accelerated dust 14 will enter the air flow measuring element 6 side.

Although a configuration is described above in which the air flow measuring element 6 is disposed inside the auxiliary air intake passage 8 in a state in which the air flow measuring element 6 is mounted on the electronic circuit 5, it is also possible to adopt a configuration such that the air flow measuring element 6 can be directly disposed without mounting onto the electronic circuit 5. In this case, the "rear face" of the electronic circuit 5 corresponds to the substrate face on the side opposite to the substrate face on the side on which the resistor pattern is formed on the substrate comprising the air flow measuring element 6. Alternatively, a configuration may also be considered in which the air flow measuring element 6 is mounted on another support member in place of the electronic circuit 5 and disposed inside the auxiliary air intake passage 8. In this case, it is sufficient to replace the electronic circuit 5 with another support member and consider the "rear face" of the electronic circuit 5.

Figure 8:
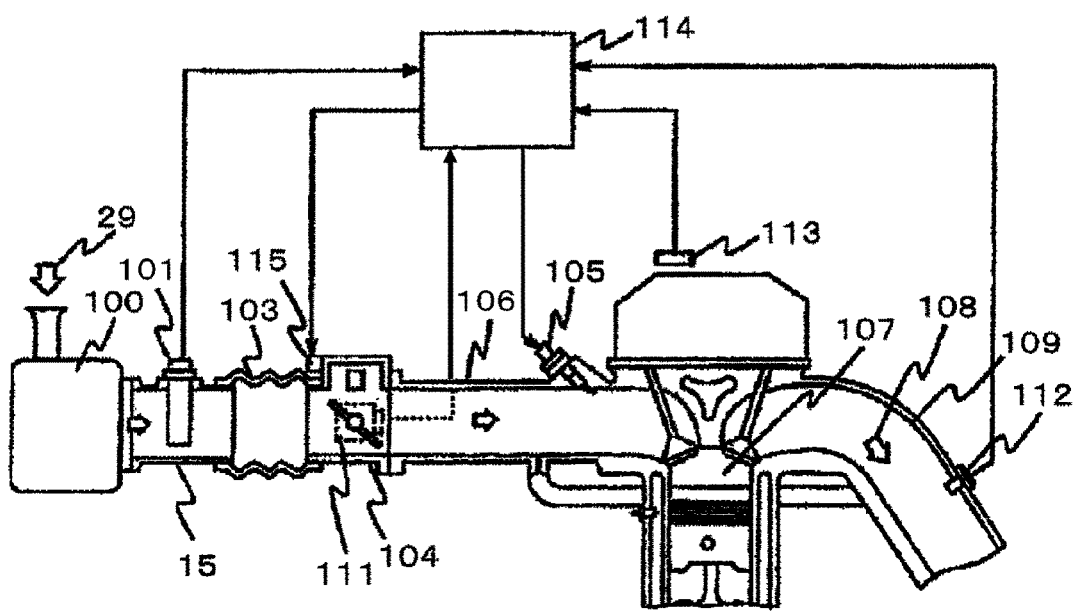
FIG. 8 is a view showing a specific configuration example of an electronically fuel-injected internal combustion engine that uses the air flow measuring instrument of the present invention.

FIG. 8 is a view that illustrates a specific configuration of the operation control system of an electronically fuel-injected internal combustion engine that uses an air flow measuring instrument 101 according to the present invention.

In FIG. 8, intake air 29 that is drawn in from an air cleaner 100 passes through the body 15 in which an air flow measuring instrument 101 is disposed, an air intake duct 103, a throttle body 104, and an intake manifold 106 comprising an injector (fuel injection valve) 105 to which fuel is supplied and is sucked into an engine cylinder 107. Gas 108 that is produced at the engine cylinder 107 is discharged to outside via an exhaust manifold 109. An air flow rate signal and an intake air temperature signal output from the air flow measuring instrument 101, a throttle valve angle signal output from the throttle angle sensor 111, an oxygen concentration signal output from the oxygen concentration sensor 112 provided in the exhaust manifold 109, and a engine speed signal output from the engine speed meter 113 and the like are supplied to a control unit 114. The control unit 114 subjects the supplied signals to consecutive operations to determine the optimal fuel injection quantity and idle air control valve opening, and controls the injector 105 and an idle air control valve 115 using those values. By using the air flow measuring instrument 101 according to the present invention for an electronically fuel-injected internal combustion engine, an accurate air flow can be measured and accurate operational control of the internal combustion engine can be performed.

The following advantages are obtained by the above described examples.

The circuit board comprising the electronic circuit is disposed parallel to the flow of fluid inside the auxiliary passage that is arranged inside the main passage through which the fluid flows. The guidance portion or the inclined face for guiding a flow of fluid inside the auxiliary passage to the rear face side that is opposite to the face on which the air flow measuring element, is disposed is provided on the upstream side face of the circuit board in the flow direction. Hence it is possible to prevent entry of dust to the fluid measuring element side, and thus damage or contamination of the fluid measuring element can be prevented.

The circuit board comprising the electronic circuit is disposed parallel to the flow of fluid inside the auxiliary passage that has at least one curved portion on the upstream side of the air flow measuring element. The protrusion for guiding the flow of fluid inside the auxiliary passage to the rear face side that is opposite to the face on which the air flow measuring element is disposed, is provided on the upstream side face of the circuit board in the flow direction. The protrusion is formed on an extension line of the outside of the curved portion. Hence it is possible to efficiently prevent dust that is subjected to centrifugation by the curve from entering the fluid measuring element side, and thus damage or contamination of the fluid measuring element can be prevented.

The circuit board comprising the electronic circuit is disposed parallel to the flow of fluid inside the auxiliary passage that is disposed inside the main passage through which the fluid flows. The protrusion for guiding the flow of fluid inside the auxiliary passage to the rear face side that is opposite to the face on which the air flow measuring element is disposed, is provided so as to cover the portion of the upstream side face of the circuit board in the flow direction. Hence, with respect to the air flow measuring instrument that has the curve, that is, has a centrifugation function, it is possible to prevent entry of dust to the fluid measuring element side while taking into account productivity and moldability (the moldability of a long slim shape is liable to worsen), and thus damage or contamination of the fluid measuring element can be prevented.

The circuit board comprising the electronic circuit is disposed parallel to the flow of fluid inside the auxiliary passage that is disposed inside the main passage through which the fluid flows. The protrusion for guiding the flow of fluid inside the auxiliary passage to the rear face side that is opposite to the face on which the air flow measuring element is disposed is provided so as to cover all of the upstream side face of the circuit board in the flow direction. Hence, even for the air flow measuring instrument with an auxiliary passage that does not have the curve, that is, does not have a centrifugation function, it is possible to prevent entry of dust to the fluid measuring element side, and thus damage of the fluid measuring element can be prevented.

The circuit board comprising the electronic circuit is disposed parallel to the flow of fluid inside the auxiliary passage that is arranged inside the main passage through which fluid flows. The protrusion for guiding the flow of fluid inside the auxiliary passage to the rear face side that is opposite to the face on which the air flow measuring element is disposed is provided as a separate member to the air flow measuring element or the circuit board on the upstream side face of the circuit board in the flow direction. Hence, while taking into account productivity, it is possible to prevent entry of dust to the fluid measuring element side, and thus damage or contamination of the fluid measuring element can be prevented.

The circuit board comprising the electronic circuit is disposed parallel to the flow of fluid inside the auxiliary passage that is arranged inside the main passage through which fluid flows. The protrusion for guiding the flow of fluid inside the auxiliary passage to the rear face side that is opposite to the face on which the air flow measuring element is disposed is provided as the soft member that is the separate member to the air flow measuring element or the circuit board on the upstream side face of the circuit board in the flow direction. Hence, by reducing the kinetic energy of dust that collides against the protrusion, for example, even when dust that collides against the protrusion is flowed to the side of the face on which the air flow measuring element is disposed due to the state of the flow, damage or contamination of the fluid measuring element can be prevented.

The circuit board comprising the electronic circuit is disposed parallel to the flow of fluid inside the auxiliary passage that is arranged inside the main passage through which fluid flows. The gap of a size through which fluid does not flow is formed between the air flow measuring element or the circuit board and the protrusion for guiding the flow of fluid inside the auxiliary passage to the rear face side that is opposite to the face on which the air flow measuring element is disposed that is provided on the upstream side face of the circuit board in the flow direction. Hence, it is possible to prevent dust that has collided against the protrusion from colliding once more against the upstream side face in the flow direction of the circuit board and thereby prevent entry of dust and dirt and the like to the fluid measuring element side, and thus damage or contamination of the fluid measuring element can be prevented.

The circuit board comprising the electronic circuit is disposed parallel to the flow of fluid inside the auxiliary passage that is arranged inside the main passage through which fluid flows. The protrusion for guiding the flow of fluid inside the auxiliary passage to the rear face side that is opposite to the face on which the air flow measuring element is disposed on the upstream side face of the circuit board in the flow direction. The protrusion is provided as the same member as the air flow measuring element or the circuit board. If manufacture of the protrusion can be carried out at low cost in the future even though manufacturing costs and productivity represent a difficulty now, it is possible to prevent entry of dust to the fluid measuring element side, and thus damage or contamination of the fluid measuring element can be prevented.

The circuit board comprising the electronic circuit is disposed parallel to the flow of fluid inside the auxiliary passage that is arranged inside the main passage through which fluid flows. The protrusion for guiding the flow of fluid inside the auxiliary passage to the rear face side that is opposite to the face on which the air flow measuring element is disposed on the upstream side face of the circuit board in the flow direction. The flow-guiding surface of protrusion is formed as the face that is inclined at 45° or less with respect to the flow of fluid inside the auxiliary passage or as the concave curved surface. Hence, dust that has collided against the protrusion does not, at least, return to the position that is further on the upstream side than the protrusion. More specifically, it is thereby possible to prevent entry of dust to the fluid measuring element side, and thus damage or contamination of the fluid measuring element can be prevented.

By making the air flow measuring instrument such that it is not easily susceptible to the influence of dust, a highly reliable operation control system of an internal combustion engine can be provided.

What is claimed is:

1. An air flow measuring instrument, comprising:
   an auxiliary passage arranged inside a main passage through which a fluid flows,
   a tabular member on which a pattern of a heating resistor for measuring an air flow is provided on one face, the tabular member being disposed inside the auxiliary passage so that the one face on which the heating resistor pattern of the tabular member is provided is disposed along a flow of fluid inside the auxiliary passage,
   a heating resistor pattern-side fluid passage portion formed so that the fluid flows between the one face of the tabular member and a passage-forming surface of the auxiliary passage, and
   a back-surface side fluid passage portion formed so that fluid flows between a face on a side opposite to the one face of the tabular member, and the passage-forming surface of the auxiliary passage; wherein,
   on an upstream end of the tabular member, a protrusion member is provided;
   the protrusion member comprises a face that is parallel to the one face of the tabular member, and an inclined face that is at an angle relative to the flow, such that it guides the flow to the back-surface side fluid passage portion side; and
   one of the protrusion member and the inclined face is formed by a member that is softer and has a smaller restitution coefficient than the tabular member.

2. The air flow measuring instrument according to claim 1, wherein
   the tabular member is a circuit board comprising an electronic circuit to which the pattern of the heating resistor is electrically connected.

3. The air flow measuring instrument according to claim 1, further comprising:
   an electronic circuit to which the pattern of the heating resistor is electrically connected; and
   a housing frame body that contains the electronic circuit;
   wherein the inclined face is molded integrally with the housing frame body.

4. The air flow measuring instrument according to claim 1, wherein
   the auxiliary passage has at least one curved portion on an upstream side of a fluid measuring element; and
   the inclined face is provided so as to cover one portion of an outer circumferential side of the curved portion of an upstream-side end of the tabular member.

5. The air flow measuring instrument according to claim 1, wherein
   the inclined face is formed by an upstream end of the tabular member.

6. An air flow measuring instrument, comprising:
   an auxiliary passage arranged inside a main passage through which a fluid flows,
   a tabular member on which a pattern of a heating resistor for measuring an air flow is provided on one face, the tabular member being disposed inside the auxiliary passage so that the one face on which the heating resistor pattern of the tabular member is provided is disposed along a flow of fluid inside the auxiliary passage, a heating resistor pattern-side fluid passage portion formed so that the fluid flows between the one face of the tabular member and a passage-forming surface of the auxiliary passage, and a back-surface side fluid passage portion formed so that fluid flows between a face on a side opposite to the one face of the tabular member, and the passage-forming surface of the auxiliary passage; wherein, on an upstream end of the tabular member there is provided a guidance portion;

the guidance portion comprises a face that is parallel to the one face of the tabular member, and an inclined face that is at an angule relative to the flow, such that it guides dust that collides against the end to the back-surface side fluid passage portion side; and one of the guidance portion and the inclined face is formed by a member that is softer and has a smaller restitution coefficient than the tabular member.

* * * * *